(12) United States Patent
Dai et al.

(10) Patent No.: US 9,534,749 B2
(45) Date of Patent: Jan. 3, 2017

(54) LIGHT TRANSMITTING SLAP WRIST DEVICE

(71) Applicants: Jianming Dai, San Jose, CA (US); Banghui An, Guangdong (CN)

(72) Inventors: Jianming Dai, San Jose, CA (US); Banghui An, Guangdong (CN)

(73) Assignee: Ming D & Y Inc., British Columbia (CA)

( * ) Notice: Subject to any disclaimer, the term of this patent is extended or adjusted under 35 U.S.C. 154(b) by 167 days.

(21) Appl. No.: 14/545,176

(22) Filed: Apr. 3, 2015

(65) Prior Publication Data

US 2016/0290624 A1 Oct. 6, 2016

(51) Int. Cl.
| | | |
|---|---|---|
| *F21V 21/08* | (2006.01) | |
| *F21L 4/02* | (2006.01) | |
| *A44C 5/00* | (2006.01) | |
| *G02B 6/00* | (2006.01) | |
| *A44C 15/00* | (2006.01) | |

(52) U.S. Cl.
CPC ............... *F21L 4/02* (2013.01); *A44C 5/0053* (2013.01); *G02B 6/00* (2013.01); *A44C 15/0015* (2013.01); *F21Y 2115/10* (2016.08)

(58) Field of Classification Search
CPC ............ F21L 4/02; A44C 5/0053; G02B 6/00; F21Y 2115/10; F21V 33/0008; A45F 2005/008; A45F 2003/006
USPC ..... 362/103, 615, 570, 108, 249.04, 249.08, 362/285, 440, 443, 457, 458; 224/222, 224/267
See application file for complete search history.

(56) References Cited

U.S. PATENT DOCUMENTS

| | | | |
|---|---|---|---|
| 4,903,176 A | 2/1990 | Chen | |
| 5,738,398 A | 4/1998 | Miano | |
| 5,879,076 A | 3/1999 | Cross | |
| 5,971,612 A | 10/1999 | McAuslan | |
| 7,347,019 B1 | 3/2008 | Shaw | |
| 8,303,129 B1 | 11/2012 | Thielen | |
| 8,398,255 B2 | 3/2013 | Starogiannis | |
| 8,727,189 B2 | 5/2014 | Zieman et al. | |

(Continued)

FOREIGN PATENT DOCUMENTS

| | | | |
|---|---|---|---|
| CN | 202302948 U | 7/2012 | |
| WO | WO 2015100333 A1 * | 7/2015 | ............. H05K 1/028 |

OTHER PUBLICATIONS

Prior public use device with bistable spring and stitching around the edges, "the prior art lighted product;" one page photo, Apr. 3, 2015.

*Primary Examiner* — Anh Mai
*Assistant Examiner* — Glenn Zimmerman

(57) ABSTRACT

A slap wrist device includes a bottom strip having top and bottom surfaces with at least the top surface of thermoplastic material, a middle strip having top and bottom surfaces and of or coated with a thermoplastic material, and a top strip having top and bottom surfaces, at least the bottom surface being of thermoplastic material. A bistable spring is disposed between the bottom and middle strips, and a light emitting and elongated flexible light transmitting element is disposed between the top and middle strips. The bottom and middle strips are sealed together by high frequency (HF) welding along substantially their entire peripheries, and the top and middle strips are sealed together by HF welding along at least the majority of their peripheries. A battery casing, with or without an external safety light, or a fabric bag, may be mounted to an end of the device.

20 Claims, 7 Drawing Sheets

(56) References Cited

U.S. PATENT DOCUMENTS

| | | | |
|---|---|---|---|
| 8,752,740 | B2 | 6/2014 | Morgan et al. |
| 2001/0043513 | A1* | 11/2001 | Grupp .................. A44C 5/0015 368/281 |
| 2003/0155389 | A1 | 8/2003 | Swartzentruber |
| 2006/0076376 | A1* | 4/2006 | Kemery ................... G08B 5/38 224/222 |
| 2012/0087216 | A1 | 4/2012 | Keung et al. |
| 2013/0044215 | A1 | 2/2013 | Rothkopf et al. |
| 2014/0103082 | A1 | 4/2014 | Schaller et al. |
| 2014/0254142 | A1* | 9/2014 | Ward ........................ G06F 1/16 362/103 |
| 2015/0117001 | A1* | 4/2015 | Fan ....................... F21V 23/001 362/235 |
| 2015/0378391 | A1* | 12/2015 | Huitema ................ G06F 1/163 361/679.03 |

* cited by examiner

LIGHT TRANSMITTING SLAP WRIST DEVICE

BACKGROUND AND SUMMARY OF THE INVENTION

Products called "slap wrist devices" are known for mounting watches, pen holders, and storage containers, such as shown in U.S. Pat. Nos. 8,727,189 and 8,752,740, and published U.S. patent applications 2003/0155389, 2012/0087216, and 2013/0044215. While such products typically use the term "wrist" they are not in any way restricted to use only on that body part, but can be used on other human body parts, pet body parts, backpacks, bicycles, or a wide variety of other devices.

One particularly desirable slap wrist device is that shown in Chinese Utility Model 202302948 published Jul. 4, 2012, and in a commercial product sold under that Utility Model (and referenced herein as "the prior art lighted product"), which utilize a light transmitting element. The prior art lighted product provides a highly desirable visibility to anyone wearing or using it, for aesthetic or novelty purposes, but especially for safety purposes at night and in low light situations. While the prior art lighted product is successful in performing its ultimate safety-enhancing function, it has a number of drawbacks, including labor-intensive manufacturing procedures, and limited functionality if the product gets wet from environmental conditions, or is on a user's body part when the user is sweating.

According to the present invention, a light transmitting slap wrist device is provided that has significant advantages over the prior art lighted product including ease of manufacture, resistance to moisture, ability to access the light emitting and transmitting components, and enhanced versatility.

The prior art lighted product utilizes a woven fabric breathable strip which cooperates with a low friction middle strip to sandwich a bistable ribbon spring between them. The middle strip and an upper strip sandwich a light emitting and elongated light transmitting flexible element between them. The bottom, middle, and top strips are stitched together around their peripheries to provide a closed element. Since the top strip is flexible a button actuator for the light emitting and transmitting flexible element may be activated, or deactivated, from the exterior of the product, and an opening is provided for removal of the battery for replacement.

According to one aspect of the present invention, a light transmitting slap wrist device is provided which has numerous advantages over the prior art lighted product. In particular, either the upper, middle, and bottom strips are made of a thermoplastic material, or have at least a partial coating of thermoplastic material, and are sealed together around their peripheries using plastic welding. While a number of different plastic welding techniques could be utilized, including ultrasonic welding and friction welding, High Frequency (HF) welding is preferred. In HF welding electromagnetic waves at a frequency of about 27.12 MHz efficiently, quickly, and with minimal labor, permanently attach the peripheries of the strips together. Desirably, one end edge of the top and middle strips are not attached so that—using a pull tab or the like—the light emitting and transmitting element (or at least a portion thereof) therebetween may be accessed. The device according to the invention has enhanced moisture resistance, is much more easily and quickly manufactured, and has enhanced functionality and versatility, compared with the prior art lighted product.

According to other aspects of the present invention, a slap wrist device is provided wherein an external battery casing connects the components together at one end thereof. The battery casing includes an LED immediately adjacent but not embedded in a high clarity translucent or transparent thermoplastic polymeric material (such as thermoplastic polyurethane, commonly known as "TPU"), circuitry, a battery, and an actuator. As another alternative, a fabric bag or like container can be provided at one end of the device, the bag not only encompassing the battery and circuitry, but also having additional interior space in which accessory devices can be stored (such as keys or identification if the slap wrist device is used while a human is exercising, or on a pet's collar). Still further, a safety light (with one or more LEDs, an incandescent bulb, halogen bulb, or the like) can be mounted on an external battery casing.

Also according to the invention, a device is provided comprising: A bottom strip having top and bottom surfaces, at least the top surface of thermoplastic material at least around the periphery thereof. A top strip having top and bottom surfaces, at least the bottom surface of thermoplastic material at least around the periphery thereof. A light emitting and elongated flexible light transmitting element disposed between the top and bottom strips, and wherein the bottom and top strips are sealed together by plastic (e. g. HF) welding along substantially the entire peripheries thereof. And a battery casing mounted at one end of the strips, the battery casing mounting a battery, electrical switch, and circuitry, therein and thereon.

The battery may comprise a rechargeable battery, and the circuitry may include a charging port which facilitates charging of the battery, and a battery indicator. An external safety light may be mounted on top of the battery casing, the external safety light operatively connected to the battery, and desirably the external safety light is at least partially rotatable with respect to the battery casing and includes at least one LED as its light source.

According to a still other aspect of the invention a device is provided as described in the previous two paragraphs only instead of a battery casing and external safety light, an openable and closeable bag is mounted at one end of the strips. The bag contains a battery and circuitry therein, and has sufficient additional interior space for readily removably containing other objects (such as keys and an ID).

It is the primary object of the present invention to provide an easy to manufacture, moisture resistant, and versatile light transmitting slap wrist device, with enhanced versatility and functionality; and related other devices. This and other objects of the invention will become clear from a detailed description of the drawings, and from the appended claims.

BRIEF DESCRIPTION OF THE DRAWINGS

FIG. 5a is a top perspective view of the device of FIGS. 1-4 in a half-coiled configuration while

FIG. 11 is a view like that of FIG. 10 of another exemplary embodiment of a device according to the invention including a fabric bag or the like;

DETAILED DESCRIPTION OF THE DRAWINGS

Figure 1:
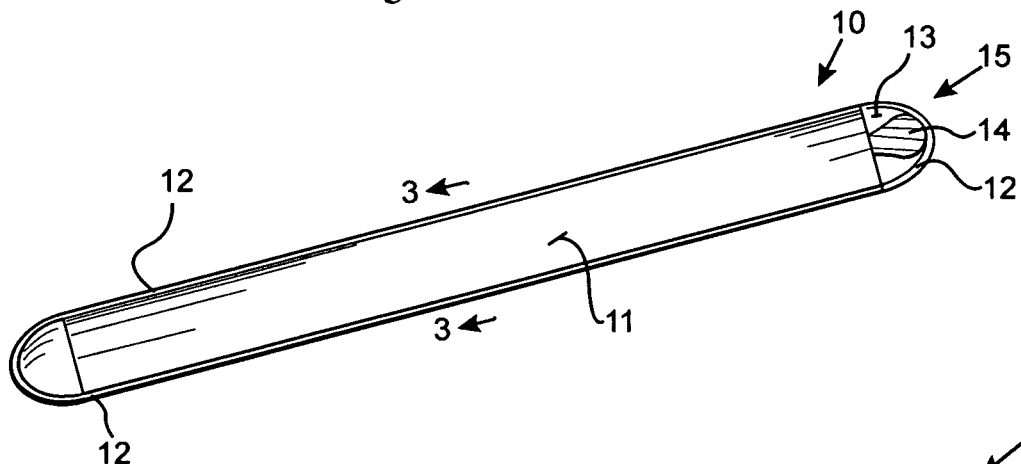
FIG. 1 is top perspective view of a first embodiment of an exemplary slap wrist device according to the present invention.

FIG. 1 shows an exemplary embodiment of a light transmitting slap wrist device 10 according to the present invention. While the term "wrist" is used in this generic term it is to be understood that the device 10 can be used with a wide variety of human body parts (including the arms, ankle, and even neck), or pet body parts (such as functioning as a pet collar), or on inanimate objects, such as bicycle handlebars, backpack straps, etc. The components visible in FIG. 1 include a top strip 11, a seal 12 provided around the peripheries of various strips and formed by plastic welding, a portion of the middle strip 13, and a pull tab at a first end 15 of the device 10.

Figure 2:
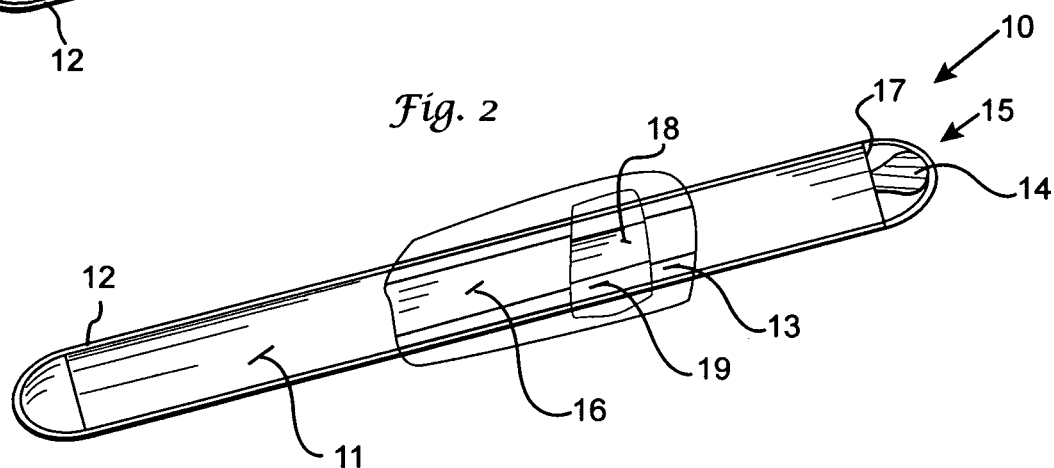
FIG. 2 is a view like that of FIG. 1 with portions cut away to illustrate the interior components of the device.
Figure 3:
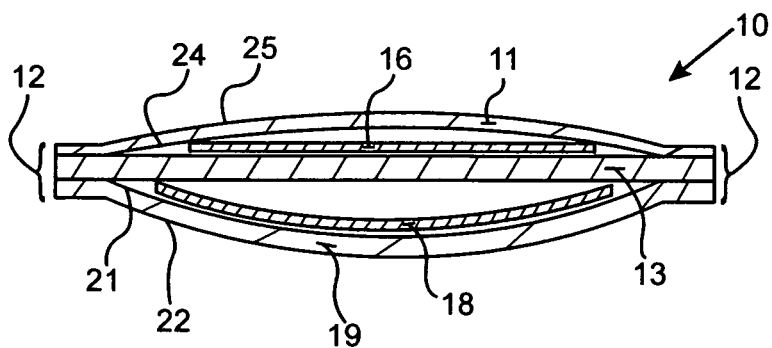
FIG. 3 is a cross-sectional view taken along lines 3-3 in FIG. 1 of the device of FIGS. 1 & 2.
Figure 4:
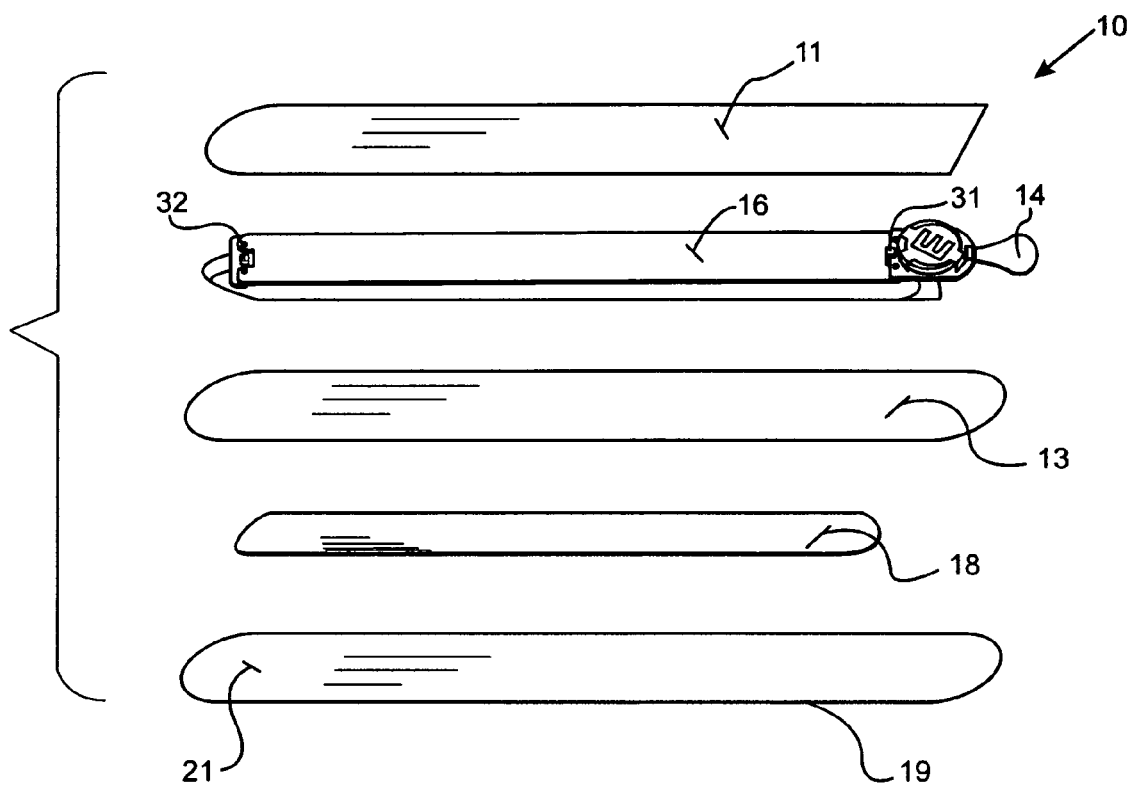
FIG. 4 is an exploded view of the device of FIGS. 1-3.

As seen more clearly in FIGS. 2-4, the device 10 also includes a flexible elongated light transmitting element 16 between the top 11 and middle 13 strips. The light transmitting element 16 per se may be as described in co-pending U.S. application Ser. No. 14/544,688 filed Feb. 4, 2015 (the disclosure of which is incorporated by reference herein), that is made of TPU or other high clarity translucent or transparent thermoplastic polymeric material (such as those listed in U.S. Pat. No. 5,879,076). The device 10 also includes a conventional bistable spring (also known as a "bistable ribbon spring" and shown per se, for example, in U.S. Pat. Nos. 4,903,176 and 5,971,612) 18 and a bottom strip 19. As especially seen in FIG. 3, the bottom strip 19 has a top surface 21 and a bottom surface 22, and the top strip 11 has a bottom surface 24 and top surface 25.

At least the bottom surface 24 of the top strip 11, or a peripheral portion thereof, is of or coated with thermoplastic material. The entire strip 11 may be made thermoplastic material, or it may be made of a fabric like material and the bottom surface 24 coated with thermoplastic material. One particularly desirable configuration is to make the top strip 11 of nylon fabric and coat the bottom surface 24 with TPU, polyethylene, TPR, or PVC film. Alternatively the strip 11 could be made completely of TPU, polyethylene, TPR, or PVC.

The middle strip 13 separates and prevents friction between the bistable spring 18 and the elongated flexible light transmitting element 16. Middle strip 13 may be made completely of TPU, polyethylene, TPR, or PVC, or have both the top and bottom surfaces thereof coated with TPU, polyethylene, TPR, or PVC film.

The bottom strip 19 may be similarly constructed like the top strip 11 except that if the entire strip is not of thermoplastic material then the top surface 21 is coated with a thermoplastic film, and the bottom surface 22 preferably has gripping characteristics.

The strips 13, 19 are sealed around substantially the entire peripheries thereof to form the seal 12 and the strips 13, 11 are sealed around at least the majority of the peripheries thereof to form the seal 12, although an opening 17 (see FIG. 2) may be provided at the first end 15 to allow ingress or egress of the element 16, e. g. when pulled by the pull tab 14. The sealing 12 of the peripheries is accomplished using plastic welding. While many types of plastic welding are utilizable, such as ultrasonic and friction, desirably the plastic welding is HF welding, which provides a simple, efficient, and effective permanent seal.

Figure 6:
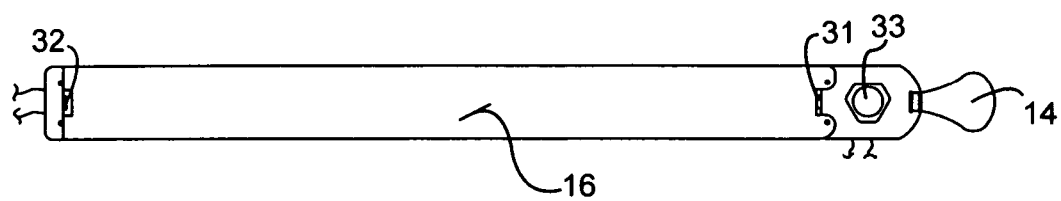
FIG. 6 is a top plan view of the opposite side of the light emitting and transmitting element shown in FIG. 4.
Figure 7:
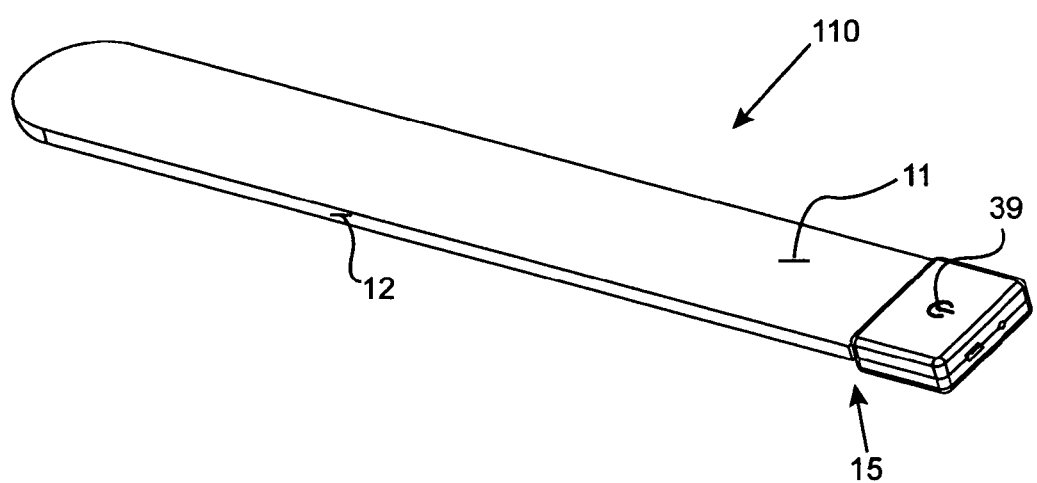
FIG. 7 is a top perspective view of a second exemplary embodiment of a slap wrist device according to the present invention.

LEDs 31, 32 are provided at opposite ends of the element 16 (see FIGS. 4 & 6) and operate to illuminate the entire element, as in co-pending U.S. application Ser. No. 14/544,688. The LEDs are connected to a suitable battery and have suitable circuitry associated therewith, such as shown in FIG. 15 of said co-pending application, and desirably the LEDs 31, 32 are operated using a dome switch 33 (FIG. 6) to control the circuitry. Only one LED 31 may be provided if desired. As in said co-pending application, the LEDs 31, 32 are mounted immediately adjacent, but not embedded in, the element 16 (i. e. directly aligned with and less than two centimeters away from, and preferably touching, it).

Figure 5A:
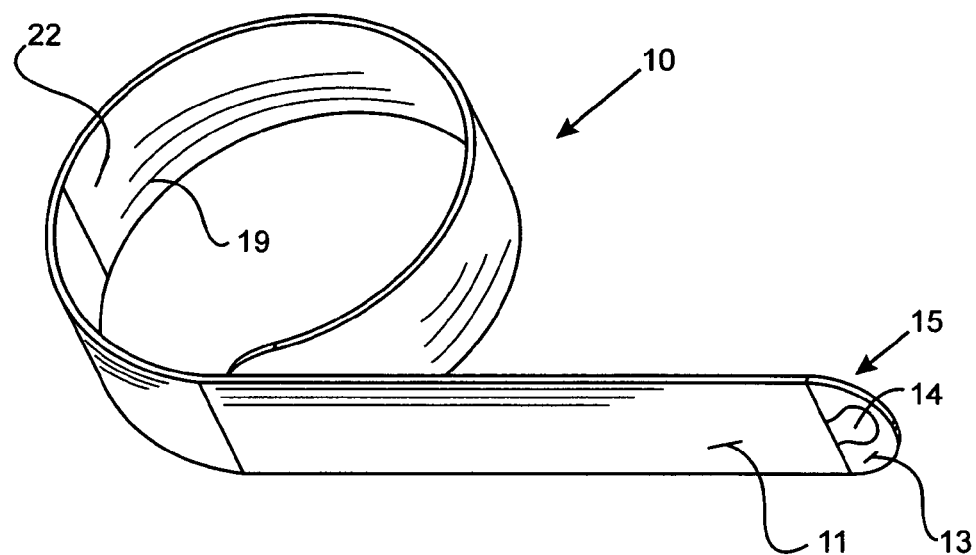
Figure 5B:
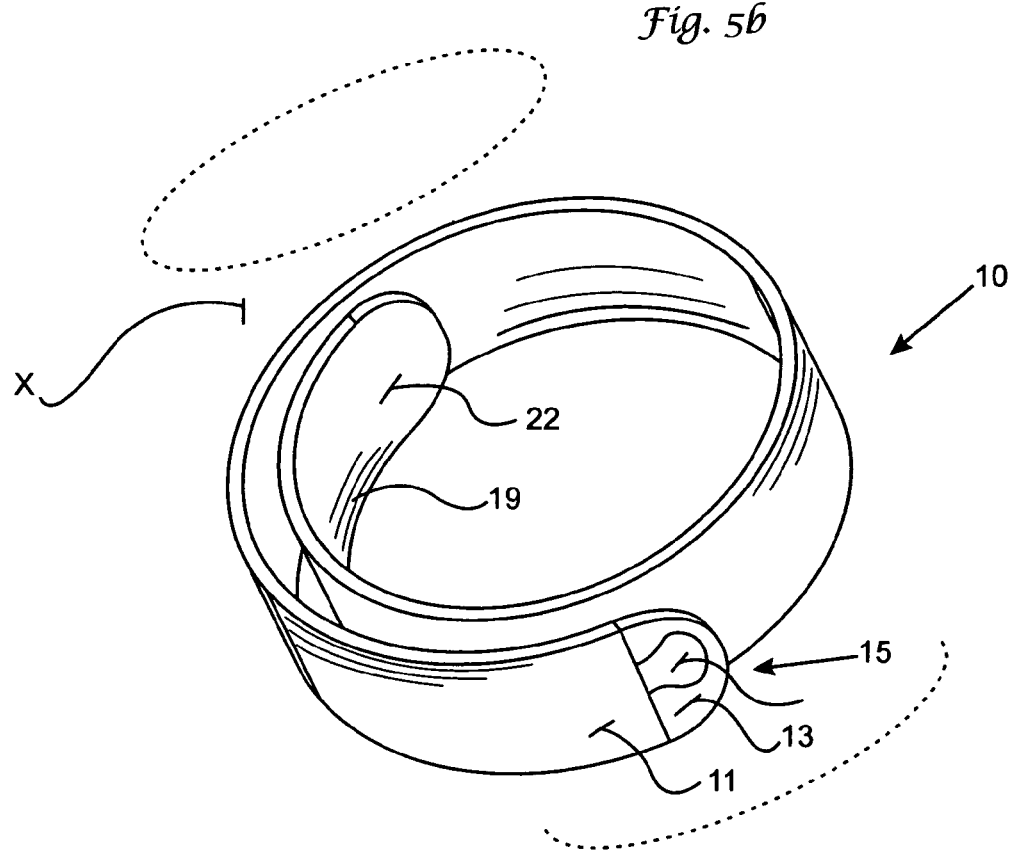
FIG. 5b shows the same device in a fully coiled configuration (e. g. around a body part, bicycle handle bar, etc.)

FIG. 5a shows the slap wrist device 10 in a half-coiled configuration, while FIG. 5b shows the device 10 in its fully coiled condition, wrapped around an appendage or object X, such as a human's wrist, arm or ankle, a pet's neck, a bicycle handlebar, or a strap of a backpack. The device 10 is moved into the FIG. 5a configuration by holding it at a central location and "slapping" it on the appendage or object X, causing the bistable spring 18 to partially coil. The device 10 is moved into the FIG. 5b configuration by holding it near its end 15 when "slapping" it into place, causing the bistable spring 18 to completely coil.

Figure 8:
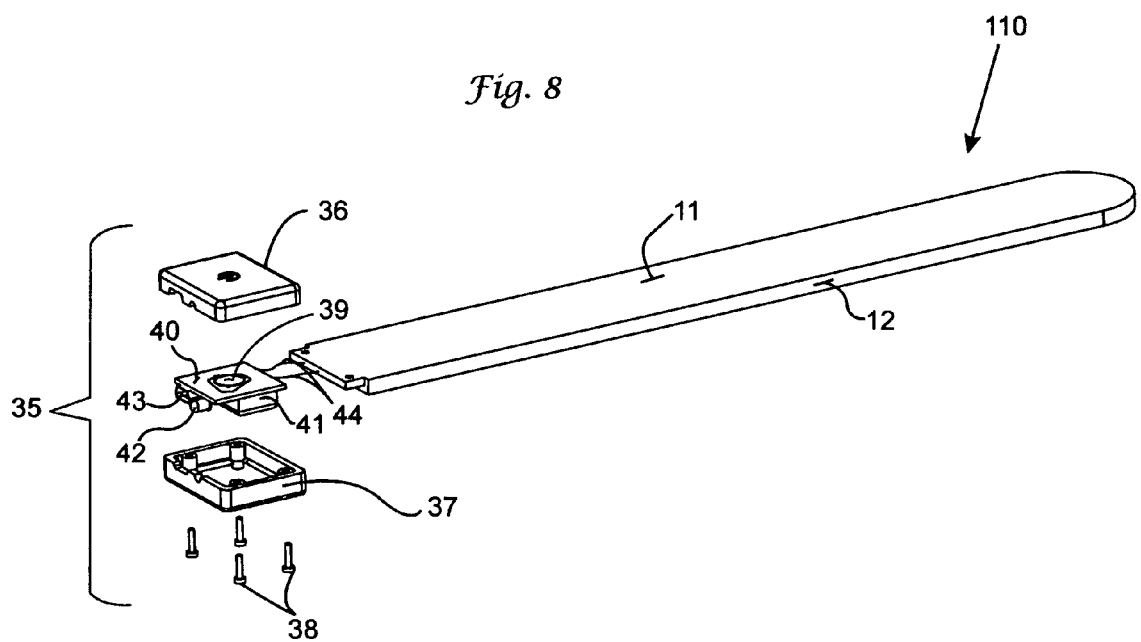
FIG. 8 is a view similar to that of FIG. 7 showing the battery casing and interior components in exploded view.
Figure 9:
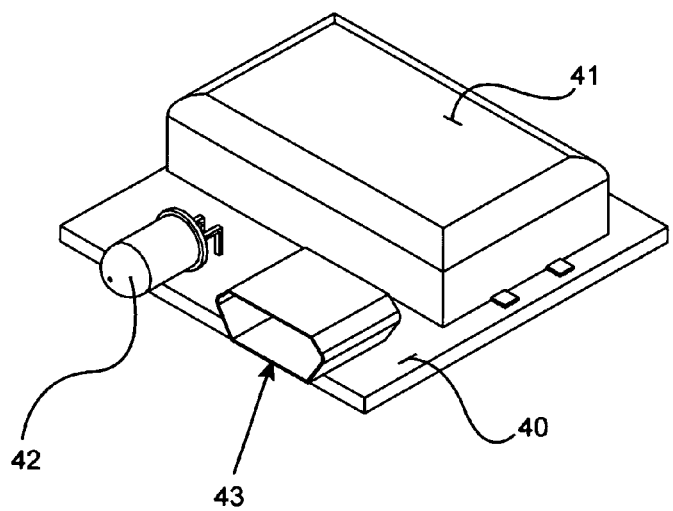
FIG. 9 is a top perspective view of the bottom side of the PCB in FIG. 8.

FIGS. 7-10 show a modified slap wrist device according to the invention, shown generally by reference numeral 110. Components the same as those in the FIGS. 1-6 embodiment are shown by the same reference numerals. In this embodiment instead of an exposed pull tab 14 which can be used to remove the element 16 with LEDs 31, 32, a battery casing 35 is mounted at one end 15 of the strips 11, 13, 19. The battery casing 35 preferably has a lid 36 and base 37 (FIG. 8) releasably held together by screw fasteners 38. The casing 35 includes a dome switch 39 which is used to control circuitry on a printed circuit board 40. In the embodiment illustrated in FIGS. 8 & 9, the battery 41 is a conventional rechargeable (e.g. lithium) battery and the PCB 40 includes a conventional charge indicating light 42 and a conventional charging port 43 (e. g. USB port) which facilitates charging of the battery 41. The battery 41 and PCB 40 are operatively connected to the LED 31 (FIGS. 4 & 6) and light transmitting element 16 via wires 44 (FIG. 8).

Figure 10:
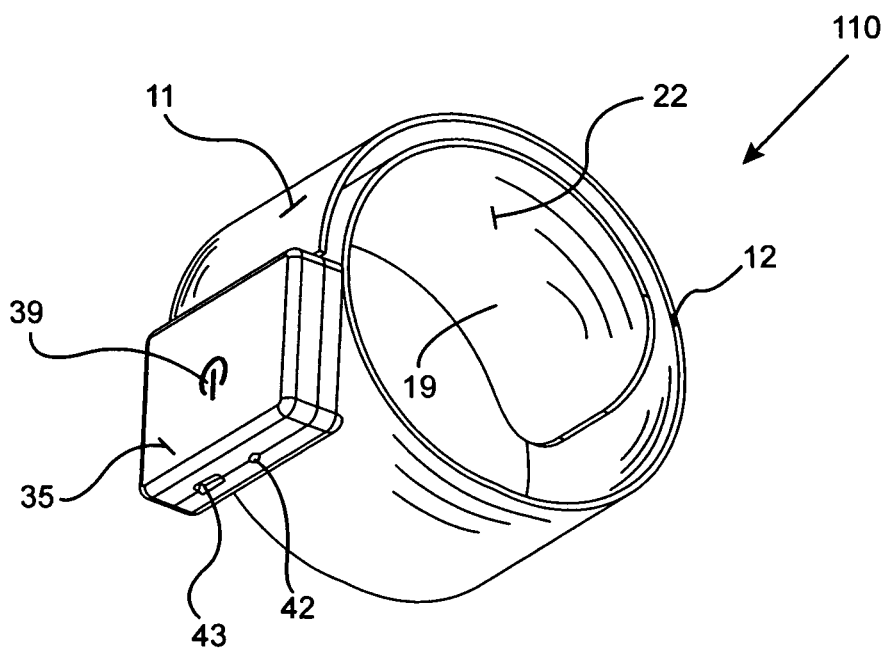
FIG. 10 is a top perspective view of the device of FIG. 7 when in a fully coiled configuration.

FIG. 10 shows the slap wrist device 110 when in the fully coiled configuration.

Figure 11:
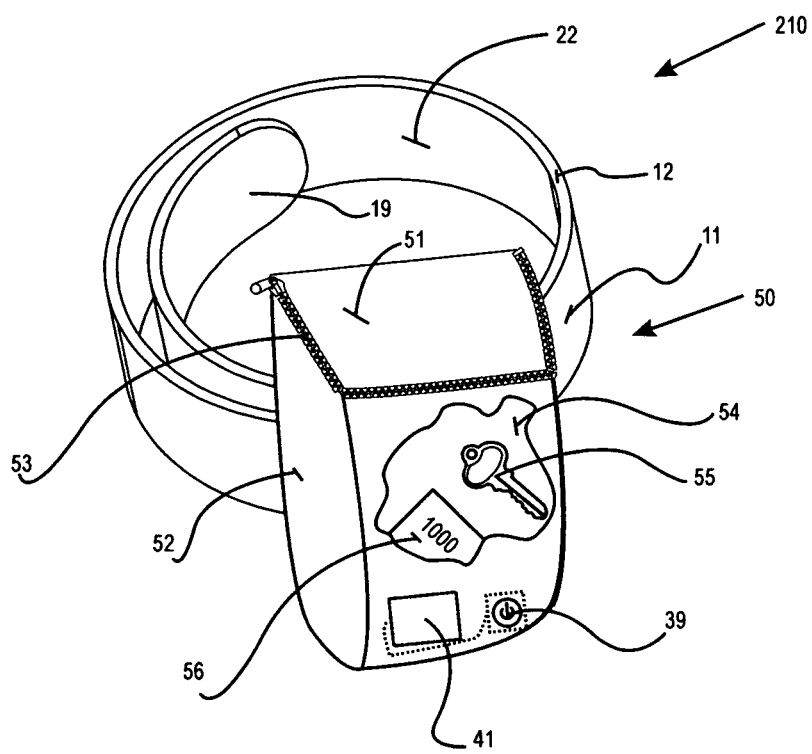

FIG. 11 shows another exemplary embodiment of a slap wrist device 210 according to the invention. Structures comparable to those in the FIGS. 1-6 embodiment are shown by the same reference numeral.

The end 15 (not visible in FIG. 11) of the strips 11, 19, etc., has an openable and closeable bag 50. The bag 50 preferably is made of fabric, although it may be made of plastic, and has a top flap 51 and side flaps 52. A zipper 53, or other fastener, holds the flaps 51, 52 in a closed configuration (as illustrated in FIG. 11), or when unzipped allows the flap 51 to be peeled away to provide access to the open interior 54 of the bag 50. In addition to housing a battery 41, switch 39, and circuitry (e. g. on a PCB 40) connected to an LED 31, the bag 50 has sufficient additional interior space 54 for readily removably containing other objects, such as keys 55, an ID or credit card 56, etc. The device 210 is especially convenient for use by an individual during exercise away from home.

Figure 12:
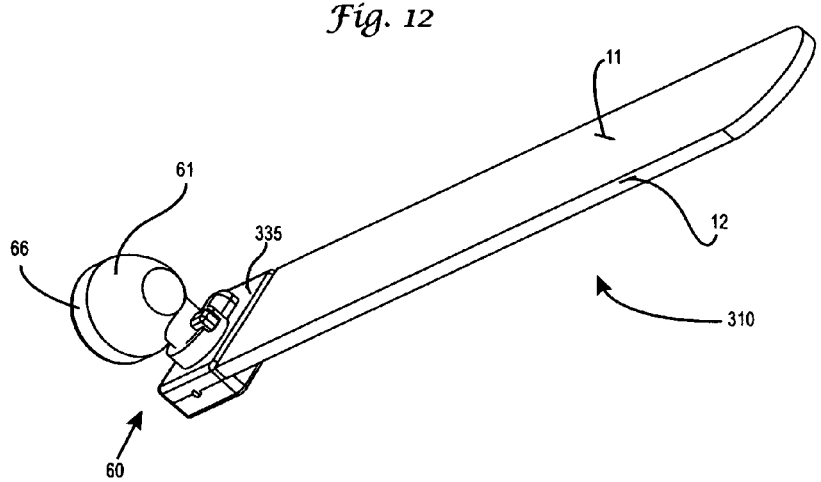
FIG. 12 is a top perspective view of yet another exemplary embodiment of a device according to the invention with an external safety light.
Figure 13:
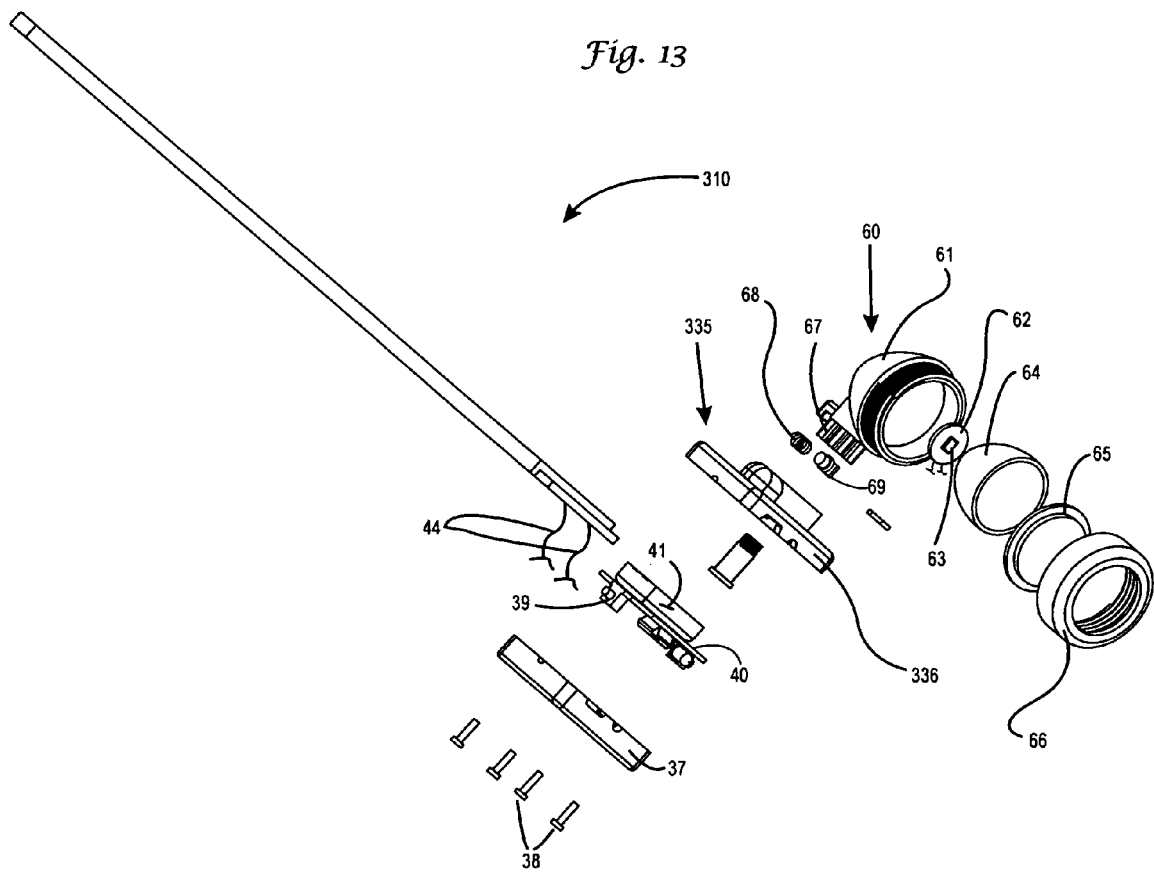
FIG. 13 is an exploded perspective view of the external safety light of the device of FIG. 12.

FIGS. 12 & 13 illustrate yet another exemplary embodiment of a slap wrist device 310 according to the invention. Structures comparable to those in the FIGS. 1-6 embodiment are shown by the same reference numeral. The FIGS. 12 & 13 embodiment is similar to the FIGS. 7-10 embodiment except that the battery casing 335 (generally comparable to the casing 35) has an external safety light 60 mounted on top 336 of the battery casing 335. The external safety light 60 also (in addition to the LEDs 31, 32) is operatively connected to the battery 41 (e.g. by conventional wires, not shown).

Typically the external safety light 60 includes an external housing 61, a PCB 62 mounting an LED 63 (such as a 3528 LED although it is possible that the light source could be an incandescent or halogen bulb), a reflective cup 64, a lens 65, and a front cover 66. In the preferred embodiment illustrated, the external safety light 60 is at least partially rotatable with respect to the top 336 of the battery casing 335. The partial rotation may be accomplished by providing a gear 67 which cooperated with a gear portion (not shown) in the casing top 336. A spring (68) pressed pin 69 may be connected to the portion of the light 60 containing the gear 67 to restrict rotation of the light 60 with respect to the casing top 336 to significantly less than 360° (e. g. 180°) to prevent twisting and tangling of the wires connecting the PCB 62 and LED 63 to the battery 41.

The invention also encompasses structures as illustrated in FIGS. 7-13 wherein no middle strip 13 or bistable spring 18 is provided, just the strips 11 and 19 sealed at 12 by HF welding with the light transmitting (e. g. TPU) element 16 and at least one LED 31, 32 immediately adjacent it.

While the invention has been herein shown and described in what is presently conceived to be desirable embodiments thereof, it is to be understood that the invention is to be given the broadest interpretation of the appended claims to encompass all equivalent structures and devices, limited only by the prior art.

What is claimed is:

1. A slap wrist device comprising:
    a bottom strip having top and bottom surfaces, at least the top surface of thermoplastic material at least around the periphery thereof;
    a middle strip having top and bottom surfaces and of or coated with a thermoplastic material;
    a bistable spring disposed between said bottom and middle strips;
    a top strip having top and bottom surfaces, at least the bottom surface of thermoplastic material at least around the periphery thereof;
    a light emitting and elongated flexible light transmitting element disposed between said top and middle strips; and
    wherein said bottom and middle strips are sealed together by plastic welding along substantially the entire peripheries thereof, and wherein said top and middle strips are sealed together by plastic welding along at least the majority of the peripheries thereof.

2. The device as recited in claim 1 wherein said top and middle strips are not sealed together at an end thereof so that said light emitting and elongated flexible light transmitting element can be at least partially removed therefrom to facilitate servicing thereof.

3. The device as recited in claim 1 wherein said light emitting and flexible elongated light transmitting element includes at least one LED immediately adjacent, but not embedded in, a high clarity translucent or transparent thermoplastic polymeric material, and circuitry for controlling the operation or turning off of said LED.

4. The device as recited in claim 1 further comprising a battery casing mounted at one end of said strips, said battery casing mounting a battery, electrical switch, and circuitry, therein or thereon.

5. The device as recited in claim 1 further comprising an openable and closeable bag mounted at one end of said strips, said bag containing a battery and circuitry and having sufficient additional interior space for readily removably containing other objects.

6. The device as recited in claim 2 wherein said light emitting and elongated flexible light transmitting element has a pull tab operatively connected thereto and readily accessible from the exterior of said device to facilitate removal thereof from between said top and middle strips.

7. The device as recited in claim 3 further comprising a dome switch for engaging or disengaging said circuitry.

8. The device as recited in claim 3 wherein said at least one LED comprises first and second LEDs mounted on opposite ends of said flexible elongated light transmitting element.

9. The device as recited in claim 4 wherein said battery comprises a rechargeable battery, and said circuitry includes a charging port which facilitates charging of said battery, and a battery indicator.

10. The device as recited in claim 4 further comprising an external safety light mounted on top of said battery casing, said external safety light operatively connected to said battery.

11. The device as recited in claim 5 wherein said bag is closed by a zippered flap.

12. The device as recited in claim 10 wherein said external safety light is partially rotatable with respect to said battery casing.

13. The device as recited in claim 12 wherein said external safety light includes at least one LED as its light source.

14. The device as recited in claim 13 wherein said battery comprises a rechargeable battery, and said circuitry includes a charging port which facilitates charging of said battery, and a battery indicator.

15. A device comprising:
    a bottom strip having top and bottom surfaces, at least the top surface of thermoplastic material at least around the periphery thereof;
    a top strip having top and bottom surfaces, at least the bottom surface of thermoplastic material at least around the periphery thereof;
    a light emitting and elongated flexible light transmitting element disposed between said top and bottom strips;
    wherein said bottom and top strips are sealed together by plastic welding along substantially the entire peripheries thereof; and
    a battery casing mounted at one end of said strips, said battery casing mounting a battery operatively connected to said light emitting element, electrical switch, and circuitry, therein or thereon.

16. The device as recited in claim 15 wherein said battery comprises a rechargeable battery, and said circuitry includes a charging port which facilitates charging of said battery, and a battery indicator.

17. The device as recited in claim 15 further comprising an external safety light mounted on top of said battery casing, said external safety light operatively connected to said battery.

18. The device as recited in claim 17 wherein said external safety light is at least partially rotatable with respect to said battery casing.

19. The device as recited in claim 17 wherein said external safety light includes at least one LED as its light source.

20. A device comprising:
- a bottom strip having top and bottom surfaces, at least the top surface of thermoplastic material at least around the periphery thereof;
- a top strip having top and bottom surfaces, at least the bottom surface of thermoplastic material at least around the periphery thereof;
- a light emitting and elongated flexible light transmitting element disposed between said top and bottom strips;
- wherein said bottom and top strips are sealed together by plastic welding along substantially the entire peripheries thereof; and
- an openable and closeable bag mounted at one end of said strips, said bag containing a battery and circuitry and having sufficient additional interior space for readily removably containing other objects.

* * * * *